United States Patent Office 3,592,772
Patented July 13, 1971

---

3,592,772
FUNCTIONAL FLUIDS CONTAINING AMMONIA FOR PREVENTING CAVITATION DAMAGE
Douglas Godfrey, San Rafael, Robert L. Peeler, Albany, and Neal W. Furby, Berkeley, Calif., assignors to Chevron Research Company, San Francisco, Calif.
No Drawing. Filed Feb. 28, 1968, Ser. No. 708,755
Int. Cl. C09k 3/00
U.S. Cl. 252—78     10 Claims

ABSTRACT OF THE DISCLOSURE

Functional fluid containing a minor amount of ammonia as a cavitation-erosion inhibiting additive.

BACKGROUND OF THE INVENTION

Functional fluids of various types are employed for numerous purposes. Illustrative of the functions served are lubrication, cooling and quenching, and, most important, energy transmission. In all of these uses, it is quite important that the materials perform their indicated function, e.g., power transmission, and that the fluids themselves do not contribute to either chemical or mechanical attack upon the equipment in which they are employed. Such equipment generally is illustrated by pumps, valves, transmission lines, reservoirs, etc. Chemical attack is usually corrosion, including either oxidative or some other form of chemical attack by the fluid itself upon metal and other surfaces of the equipment. Mechanical attack which often occurs is usually manifested by erosion of the solid parts and ordinarily accompanies cavitation in the fluid. Cavitation results when a fluid at a given pressure moves toward a lower pressure with an accompanying increase in fluid velocity. When the pressure drop reaches a certain level, and the level, of course, varies with the inherent characteristics of the fluid, the fluid cavitates and cause erosive attack upon various parts of the fluid carrying system, usually those parts located downstream from the point at which the pressure drop occurs.

Thus, the effect of cavitation upon the mechanical parts of various systems is often quite severe, and, as well, there also often results breakdown of the functional fluid itself. The effects upon mechanical parts include decrease in strength of various components such as pumps (especially impellers) and valves. Erosion of the valves often results in excessive leaking and possible complete breakdown of the valve with ultimate serious effects. Additionally, the metal fragments which are eroded from the metal parts often enter the fluid and cause decreased lubrication and actual friction wear of many other tightly fitting or moving parts. Other effects which often result include clogging of the filters and as previously noted, degradation of the fluid itself, resulting in short life for the fluid because of increased viscosity, acid number, insoluble materials, chemical activity, etc.

Recent developments in the aircraft industry, with the increased use of high pressure hydraulic systems, have focused attention upon the problem of damaging effects from cavitation. These effects have been noticeable in the case of systems which employ phosphate ester fluids. It has recently been disclosed that the operation of a hydraulic system with a completely dry fluid produced greater cavitation damage than when the system was operated with fluid which was contaminated with water. From these facts, it was deduced that the presence of a small amount of water in the system retarded somewhat the damage resulting from cavitation erosion. The effectiveness of water in reducing the damage, however, is somewhat limited and the degree of protection against damage afforded is comparatively small.

SUMMARY

It has now been found that the inclusion of a minor amount of ammonia in functional fluid compositions results in a highly significant decrease in the amount of cavitation erosion and damage to systems in which the fluid compositions are employed.

DESCRIPTION

The amount of ammonia which must be added to each functional fluid in order to effectively prevent cavitation damage depends upon the nature of the functional fluid. The propensity of various fluids for promoting cavitation damage varies greatly with the character of the fluid. For example, mineral oil based materials are generally quite low in promoting cavitation damage while the phosphate ester based materials have been found to be quite high in their cavitation damage producing characteristics. Thus, the amount of ammonia in a phosphate ester will generally be significantly higher in an ester than in a mineral oil. Additionally, a limiting factor in the amount of material that may be introduced results from the solubility of ammonia in the various base materials. In general, an amount near solubility is preferred to prevent cavitation damage in most fluids, although as data will show, amounts lower than 0.1% are somewhat effective. Thus, amounts of from about 0.05 to 5.0% by weight are preferred. It is preferred that the ammonia concentration be above at least 50% of saturation.

The additive is added by passing the gas through the fluid until the fluid is wholly saturated, or is partially saturated to a degree necessary to control cavitation damage.

During operation of the particular system which is to be protected, the level of ammonia necessary to protect the system may be maintained, if necessary, by addition of supplementary additive, for example, from a cylinder. Thus within the scope of the invention is the method of preventing cavitation damage to a hydraulic system by means of maintaining in the fluid employed in the system a concentration of ammonia sufficient to inhibit the damage.

The functional fluids in which the additives of this invention are employed include a wide variety of base materials including esters of phosphorus acids, mineral oils, synthetic hydrocarbon oils, silicates, silicones, monoesters, dicarboxylic acid esters, chlorinated biphenyls, esters of polyhydric materials, aromatic ethers, thioethers, etc.

The most common phosphorus acid esters which are used are the triesters of orthophosphoric acid. The three classes of materials are trialkyl phosphates, triaryl phosphates, and mixed alkyl-aryl phosphates. The esters may be represented by the following formula.

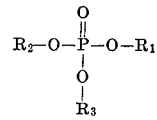

wherein $R_1$, $R_2$ and $R_3$ are alkyl, aryl, substituted aryl, or substituted alkyl groups.

Alkyl groups which may be employed include methyl, ethyl, propyl, isopropyl, n-butyl, isobutyl, sec.-butyl, tert.-butyl, n-amyl, isoamyl, 2-methylbutyl, 2,2-dimethylpropyl, 1-methylbutyl, diethylmethyl, 1,2-dimethylpropyl, tert.-amyl, n-hexyl, 1-methylamyl, 1-ethylbutyl, 1,2,2-trimethylpropyl, 3,3-dimethylbutyl, 1,1,2-trimethylpropyl, 2-methylamyl, 1,1-dimethylbutyl, 1-ethyl-2-methylpropyl, 1,3-dimethylbutyl, isohexyl, 3-methylamyl, 1,2-dimethylbutyl, 1,2 - dimethyl-1-ethylpropyl, 1,1,2-trimethylbutyl, 1-isopropyl-2-methylpropyl, 1-methyl-2-ethylbutyl, 1,1-diethylpropyl, 2-methylhexyl, 1-isopropylbutyl, 1-ethyl-3-methylbutyl, 1,4-dimethylamyl, isoheptyl, 1-ethyl-2-methylbutyl, n-octyl, 1-methylheptyl, 1,1-diethyl-2-methylpropyl, 1,1-diethylbutyl, 1,1-dimethyl-hexyl, 1-methyl-1-ethylamyl, 2-ethylhexyl, 6-methylheptyl, n-nonyl,1-methyloctyl, 1-ethylheptyl, 1,1-demethylheptyl, 1,1-diethyl-3-methylbutyl, diisobutylmethyl, 3,5-dimethylheptyl, n-decyl, 1-propylheptyl, 1,1-dipropylbutyl, 2-isopropyl-5-methylhexyl, undecyl, n-dodecyl, n-tridecyl, n-tetradecyl, n-hexadecyl, etc.

Substituted alkyl groups may also be employed. Thus the alkyl materials may be substituted with halogens, especially chlorine and fluorine, and with alkoxy groups, etc. Examples of the substituted alkyl groups include butoxyethyl, benzoxyethyl, 2-chloroethyl, 2-fluoroethyl, etc.

Examples of suitable aryl radicals which may be used in the triaryl and mixed alkyl aryl phosphates include phenyl, xylyl, cresyl and halogenated phenyl. A commonly used halogenated aryl material is orthochlorophenyl.

In addition to the oxy esters of phosphoric acid, amides and sulfoesters may be employed. The dibasic acid esters which are used as functional fluids, esters derived from sebasic, adipic, and azelaic acids are most commonly used. Suberic, hydroxysuccinic, fumaric, maleic, etc. are sometimes used. The alcohols employed are usually long chain materials such as octyl, decyl, dodecyl, and various oxo alcohols. Short chain alcohols such as butyl, amyl, hexyl, etc. may also be employed. Aromatic alcohols such as benzyl and substituted benzyl alcohols may also be used.

The silicones which are employed as functional fluids may be represented by the following formula:

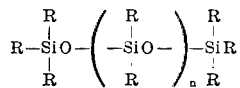

where the R's may be the same or different organic groups. $n$ may represent a small digit or a very large number.

The most important commercial materials are the dimethyl silicone fluids, however, other fluids are available with alkyl, substituted alkyl, aryl and substituted aryl groups. Examples of other available substituents are dimethyl, phenyl methyl, phenyl, chlorophenyl, trifluoropropylmethyl, trifluoropropylmethyl dimethyl, etc. The siloxanes are available in various lengths from dimers, trimers, etc. to low, medium and high polymers. Thus in the case of dimethyl polysiloxanes, the materials have a molecular weight of from 162 to 148,000.

Silicate esters are also employed as functional fluids. The materials called orthosilicate esters can be considered to be the reaction product of silicic acid, $Si(OH)_4$ and an alcohol or phenol. The structural formula may be represented as follows:

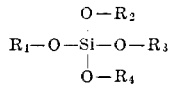

where $R_1$, $R_2$, $R_3$, and $R_4$ are organic groups. Similar to the phosphate esters previously discussed, the materials may generally be classified as tetraalkyl, tetraaryl and mixed alkyl aryl orthosilicates. The organic groups may be substituted by chloro, nitro, fluoro, alkoxy, and thioalkoxy, etc., groups.

Related materials which are available are called "dimersilicates" and may be named hexaalkoxy or hexaaryloxy disiloxanes. Typical orthosoilicates include tetra(2-ethylbutyl),
tetra(2-pentyl),
tert.-butyl tri(2-ethylhexyl),
tert.-butyl tri(2-octyl),
tert.-butyl tri(5-ethyl-2-nonyl),
di(tert.-butyl) di(2-ethylhexyl),
di(tert.-pentyl) di(2-ethylhexyl),
di(tert.-butyl) di(2-pentyl),
tri(tert.-butyl-2-ethylhexyl,
tetra-n-propyl,
tetra-n-1,1,3-trihydropropforyl,
tetra-n-1,1-dihydropropforyl,
tetra-n-butyl,
tetra-n-amyl,
tetra-n-1,1,5-trihydropropforyl, and derivatives.

Another class of functional fluids which may be employed include the polyphenyl ethers. Examples of these materials include bis(p-phenoxyphenyl) ether,
bis(o-phenoxy-phenyl) ether,
bis(m-phenoxyphenyl) ether,
m-phenoxyphenyl-p-phenoxyphenyl ether,
m-phenoxyphenyl-o-phenoxyphenyl ether,
bis(mix-phenoxyphenyl) ether,
p-bis(p-phenoxyphenoxy) benzene,
mix-bis(mix-phenoxyphenoxy) benzene,
bis[p-(p-phenoxyphenoxy)phenyl] ether,
m-bis[m-(m-phenoxyphenoxyphenoxy] benzene, and
bis[p-(p(p-phenoxyphenoxy) phenoxy) phenyl] ether.

(The prefix "mix" indicates a mixture of isomers having varied linkage orientation. See Gunderson et al., Synthic Lubricants (New York, Reinhold Publ. Co.: 1962), p. 411, note b.) The phenyl groups and the polyphenyl ether may be substituted by various substituents including methyl, ethyl, n-propyl, iso-propyl, tert.-butyl, n-octyl, cyclohexyl, cyclopentyl, chloro, bromo, hydroxyl, methoxyl, cumyl, etc.

Hydrocarbon oils, including natural mineral oils obtained from petroleum and synthetic hydrocarbons, are also a suitable base material. The mineral oils include a wide variety of naphthenic, paraffin and asphalt base oils.

Synthetic oils which are employed include alkylated waxes, alkylated hydrocarbons of relatively high molecular weight, hydrogenated polymers of hydrocarbons and condensation products of chlorinated alkyl hydrocarbons with aryl compounds. Other suitable oils are those obtained by polymerization of low molecular weight alkylene oxides such as propylene and/or methylene oxide. Still other synthetic oils obtained by etherification and/or esterification of the hydroxy groups and alkylene oxide polymers, such as, for example, the acetate of the 2-ethylhexanol-initiated polymer of propylene oxide.

Mixtures of the above-mentioned fluids may be employed as well as the pure substances.

The following example serves to illustrate the invention. The example, however is but illustrative and is non-limiting.

EXAMPLE

Cavitation erosion by phosphate ester fluid

The erosive damage from cavitation by a phosphate ester functional fluid was determined by means of a thin film cavitation apparatus. Briefly, the test involves impinging an ultrasonic probe within a very small distance of a metal specimen while both probe and specimen are immersed in the subject fluid. Power is applied and the apparatus is allowed to operate for a specified period. The specimen is then removed and weight loss during the test is determined.

More specifically, the apparatus employed is a 0.5 inch diameter ultrasonic probe which is caused to vibrate axially in the liquid at 20 kcs. with an amplitude of approximately 0.0002 inch, with the flat end 0.010 inch from a metal specimen. The probe employed is of the self-containing piezoelectric type, delivering 92% of the 125 watt power input to the tip. The probe is fastened to the movable portion of a precision way which is mounted on a massive steel post and base. A precision dial gauge allows film thickness adjustment to 0.0001 inch.

The probe and specimen are located within a 50 ml. cell in which the test fluid is placed. For testing with a circulating liquid a cell may be employed which is equipped with an inlet and outlet connected with a 500 ml. reservoir and pump. The metal specimens employed in the following tests were ¼" thick, 1" diameter copper cylinders.

The tests are performed as follows: the copper specimens are abraded on successively finer metallographic polishing paper to 3/0, ending with random scratches, followed by ultrasonic cleaning in hexane and then pentane followed by rapid drying in a blast of warm air to prevent moisture condensation. The specimen is placed in the cell which is filled with the functional fluid sample and the fluid film thickness is set by the use of a feeler gauge. With copper the tests were run for 30 minutes. Specimen damage was measured by weight loss.

The phosphate ester employed was a material consisting primarily of dibutyl phenyl phosphate (about 70%) containing minor portions of butyl diphenyl phosphate and tributyl phosphate. The fluid contained about 6% of an alkyl acrylate viscosity index improver, minor amounts of corrosion and oxidation inhibitors and a silicone antifoam agent.

The ester used in the test had the following properties:

Viscosity, cs.:
  100° F. _____ 12
  210° F. _____ 3.9
Specific gravity, 77° F. _____ 1.065
Autogenous ignition temperature, ° F. _____ 1100
Flash point, ° F. _____ 360

The tests were performed according to the above procedure with various portions dissolved. Comparison tests were performed on dry fluid and on samples containing water. These data are set forth in the following table:

TABLE

Thin film cavitation erosion tests employing phosphate ester base one half hour with copper specimen

| | Additive | | Weight loss, mg. |
|---|---|---|---|
| | Type | Initial concentration, g./100 g. | |
| Experiment: | | | |
| 1 | Ammonia | .595 (saturated) | 0.6 |
| 2 | do | 0.119 (20% saturated) | 1.4 |
| 3 | do | 0.060 (10% saturated) | 8.7 |
| 4 | None | | 15.6 |
| 5 | Water | 1.96 (saturated) | 13.1 |
| 6 | do | 1.0 to 1.5 | 12.9 |
| 7 | do | 0.5 | 11.8 |

It will be noted that these data show that the presence of ammonia significantly reduced the damage resulting from cavitation in the phosphate fluids. Note that the dry fluid produced a weight loss of 15.6 mg., water, a damage-reducing additive employed in commercial fluid, reduced the loss to only 12.9 mg., while the ammonia at saturation (about 0.6%) reduced the loss to 0.6 mg. and was still effective at less than 0.1% concentration (0.06 g./100 g.).

The additives are those effective in preventing cavitation damage in numerous applications. Such damage arises not only in hydraulic systems, but in almost any system in which a liquid is pumped under considerable pressure.

In addition to the cavitation erosion inhibitors of this invention, the functional fluids, dependent upon the particular use for which the fluid is employed, may contain a variety of additional conventional additives such as oxidation inhibitors, detergents, or dispersants, sludge inhibitors, pour depressants, V.I. improvers, rust inhibitors, oiliness agents, wear inhibitors, antifoaming agents, dyes, etc.

What is claimed is:

1. A power transmission fluid consisting essentially of a major portion of a fluid base selected from the group consisting of an ester or amide of a phosphorus acid, a silicate ester, a silicone, and a polyphenyl ether, and having a tendency to cause cavitation erosion; and as an additive effective in reducing such erosion, ammonia in an amount of from about 0.05 weight percent up to the maximum amount soluble in said base.

2. The fluid of claim 1, in which the functional fluid base is a phosphate ester.

3. The fluid of claim 2, in which the phosphate ester is a mixed alkyl aryl ester.

4. The fluid of claim 3, in which the mixed alkyl-aryl phosphate is dibutyl phenyl phosphate.

5. The fluid of claim 4, in which the concentration of ammonia is at least 0.1% by weight.

6. A method of inhibiting the cavitation eroding character of a power transmission fluid consisting essentially of a major portion of a fluid base selected from the group consisting of an ester or amide of a phosphorus acid, a hydrocarbon oil, a silicate ester, a silicone, and a polyphenyl ether, and having a tendency to cause cavitation erosion which comprises maintaining in said fluid by addition a concentration of ammonia of from about 0.05 weight percent up to the maximum amount soluble in said base.

7. The method of claim 6 in which the base consists essentially of a phosphate ester.

8. The method of claim 7 in which the phosphate ester is a mixed alkyl-aryl phosphate.

9. The method of claim 8 in which the mixed alkyl-aryl phosphate is dibutyl phenyl phosphate.

10. The method of claim 6 in which the concentration of ammonia is maintained by addition above at least 50% of saturation.

References Cited

UNITED STATES PATENTS 3,513,097    5/1970    Langenfeld _____ 252—78
2,184,993   12/1939    Coons _____ 262—69

OTHER REFERENCES

"The Electrochemical Approach to Cavitation Damage and its Prevention," H. S. Preiser & B. H. Tytell (1961), vol. 17, "Corrosion," pp. 535T–541T.

"Cavitational Erosion and Means for its Prevention," I. N. Bogacher & R. I. Mints—U.S. Clearing House.

"Chem. Abstr.," vol 64—col. 9202c (1966).

LEON D. ROSDOL, Primary Examiner

D. SILVERSTEIN, Assistant Examiner

U.S. Cl. X.R.

252—49.6, 49.9, 59, 73, 389